US011351953B2

(12) United States Patent
Deutschmann et al.

(10) Patent No.: US 11,351,953 B2
(45) Date of Patent: Jun. 7, 2022

(54) AIRBAG TETHER SEPARATION (71) Applicant: Toyoda Gosei Co., Ltd., Kiyosu (JP)

(72) Inventors: Roy P. Deutschmann, Troy, MI (US);
Srinivas Krishnan, Troy, MI (US);
Roland Furtado, Troy, MI (US)

(73) Assignee: Toyoda Gosei Co., Ltd., Kiyosu (JP)

( * ) Notice: Subject to any disclaimer, the term of this patent is extended or adjusted under 35 U.S.C. 154(b) by 0 days.

(21) Appl. No.: 16/986,892

(22) Filed: Aug. 6, 2020

(65) Prior Publication Data

US 2022/0041125 A1 Feb. 10, 2022

(51) Int. Cl.
*B60R 21/2338* (2011.01)

(52) U.S. Cl.
CPC .......... *B60R 21/2338* (2013.01); *B60R 2021/23384* (2013.01)

(58) Field of Classification Search
CPC .............. B60R 21/2338; B60R 2021/23384
See application file for complete search history.

(56) References Cited

U.S. PATENT DOCUMENTS

| 6,076,854 A * | 6/2000 | Schenck | B60R 21/233 |
| | | | 280/728.1 |
| 2002/0158456 A1 * | 10/2002 | Fischer | B60R 21/205 |
| | | | 280/743.2 |
| 2004/0104564 A1 * | 6/2004 | Hawthorn | B60R 21/2338 |
| | | | 280/743.2 |
| 2006/0163855 A1 * | 7/2006 | Szidzek | B60R 21/2338 |
| | | | 280/743.1 |
| 2006/0249943 A1 * | 11/2006 | Bauer | B60R 21/231 |
| | | | 280/743.2 |
| 2006/0284404 A1 | 12/2006 | Green et al. | |
| 2007/0194561 A1 * | 8/2007 | Thomas | B60R 21/2171 |
| | | | 280/728.2 |
| 2008/0211214 A1 | 9/2008 | Ishiguro et al. | |
| 2009/0301339 A1 | 12/2009 | Ito et al. | |
| 2013/0056344 A1 | 3/2013 | Borg | |
| 2017/0305381 A1 | 10/2017 | Kwon | |

FOREIGN PATENT DOCUMENTS

| DE | 10158222 A1 * | 6/2003 | .......... B60N 2/4279 |
| EP | 0563947 A1 | 10/1993 | |
| GB | 2299550 A * | 10/1996 | ......... B60R 21/2338 |
| GB | 2415665 A * | 1/2006 | .......... B60R 21/233 |

* cited by examiner

*Primary Examiner* — Drew J Brown
(74) *Attorney, Agent, or Firm* — Christopher G. Darrow; Darrow Mustafa PC (57) ABSTRACT

An airbag can include active vents to manage the pressure within the airbag when deployed. The active vent can be at least partially controlled by using a tether. A tether separator can be configured to separate the tether. The tether separator can include an explosive. The tether separator can be operatively positioned relative to the tether such that, when the tether separator is activated, the explosive produces shockwaves and/or heat energy. The shockwaves and/or the heat energy can cause the tether to be separated into two pieces. In some instances, a portion of the tether can be held in tension to facilitate the separation of the tether.

20 Claims, 13 Drawing Sheets

AIRBAG TETHER SEPARATION

FIELD

The subject matter described herein relates in general to airbags and, more particularly, to airbag tethers.

BACKGROUND

Airbags are used in vehicles to protect vehicle occupants. During a crash event, the airbag is configured to rapidly inflate to provide soft cushioning and restraint for a vehicle occupant. The airbag provides an energy-absorbing surface between a vehicle occupant and one or more relatively hard vehicle structures (e.g., a steering wheel, instrument panel, body pillar, headliner, and windshield). An airbag, especially when used in combination with a seatbelt, can reduce the risk of serious injuries and fatalities for vehicle occupants.

SUMMARY

In one respect, the present disclosure is directed to an airbag tether separation system. The system includes a tether and a tether separator. The tether separator can include an explosive. The tether separator can be operatively positioned relative to the tether such that, when the explosive is activated, the explosive produces shockwaves and/or heat energy. The shockwaves and/or the heat energy can cause the tether to be separated into two pieces.

In another respect, the present disclosure is directed to an airbag tether separation method. A tether separator can be operatively positioned relative to a tether. The tether separator can include an explosive. The method can include activating the explosive to cause least one of shockwaves and heat energy to be produced by the explosive. The method can include causing the tether to be separated by at least one of the shockwaves and the heat energy.

DETAILED DESCRIPTION

Some airbags include one or more vents that can relieve pressure inside the airbag. In some instances, these vents can be actively managed vents. Active vents can be used as a tuning feature to manage airbag internal pressure and/or airbag stiffness. A tether can be operatively connected to the actively managed vent. The tether can be released, which, in turn, can cause a vent to be opened or closed depending on the vent configuration. Arrangements described herein can reliably and effectively cause a tether to be released. Arrangements described herein use an explosive. When activated, the explosive can produce shockwaves and/or heat energy. The explosive can be operatively positioned relative to a portion of the tether such that the shockwaves and/or heat energy cause the tether to be separated.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-17, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
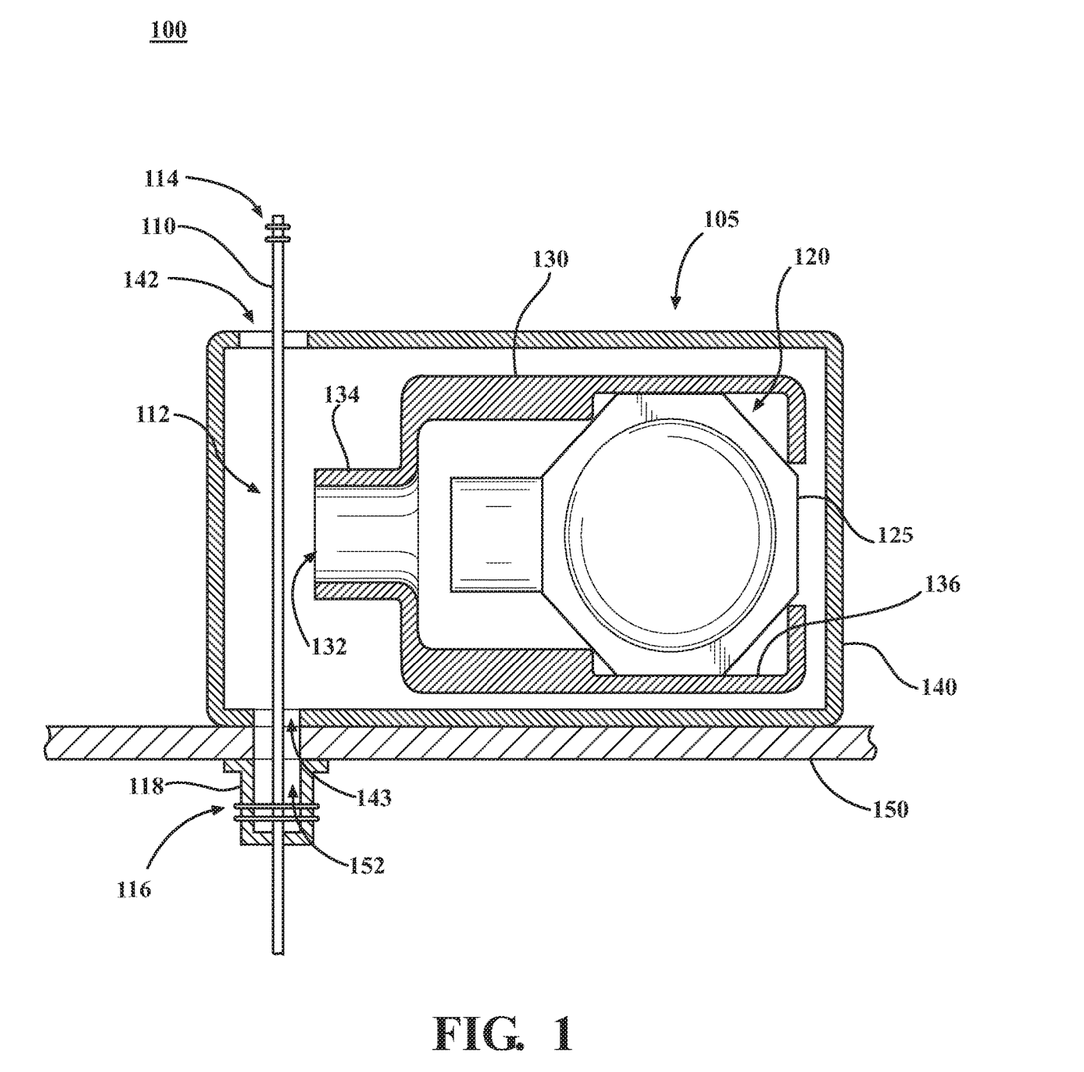
FIG. 1 is a view of an airbag tether separation system, showing a non-activated state.
Figure 2:
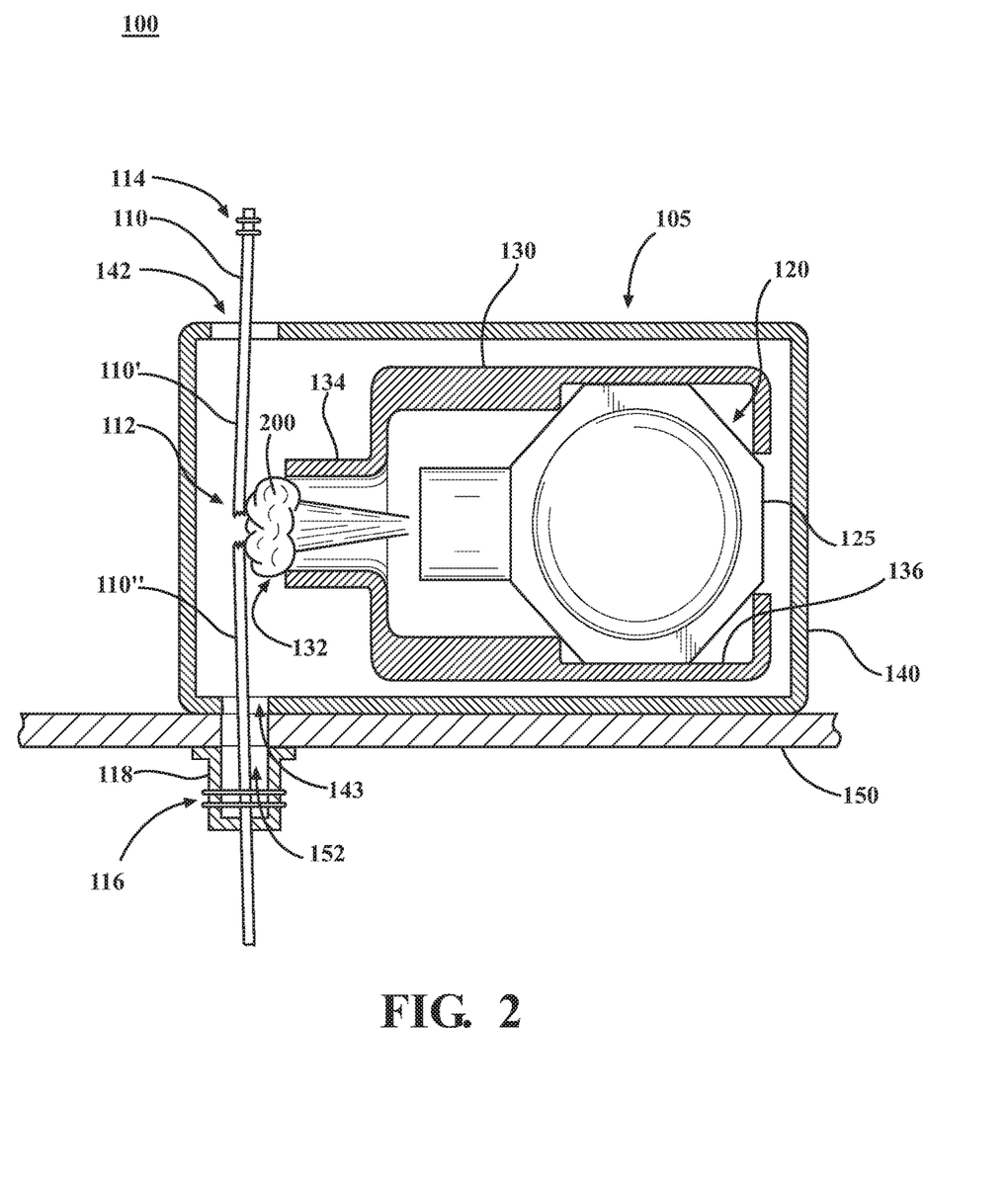
FIG. 2 is a view of the airbag tether separation system, showing an activated state.
Figure 3:
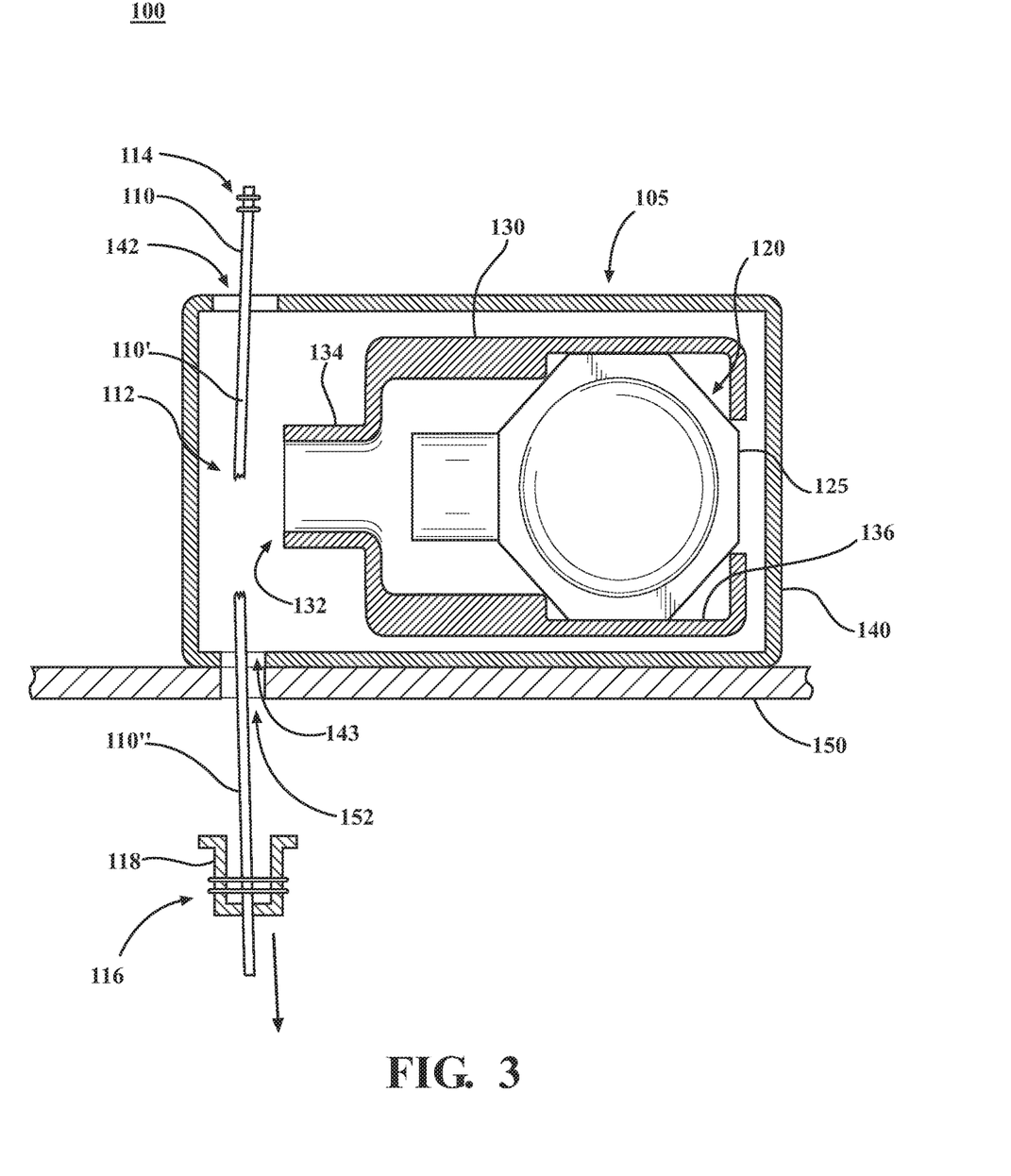
FIG. 3 is a view of the airbag tether separation system, showing a post-activated state.

Referring to FIGS. 1-3, an example of an airbag tether separation system 100 is shown. The airbag tether separation system 100 can include a tether separator 105. The tether separator 105 can be configured to cause a tether 110 of an airbag to be separated into two pieces. In some arrangements, the separation of the tether 110 can cause a vent aperture in an airbag cushion to open, which can reduce the internal pressure of the airbag cushion. In other arrangements, the separation of the tether 110 can cause the vent aperture in the airbag cushion to close.

The tether separator 105 can include an explosive 120. The explosive 120 can be provided in any suitable form. For instance, the explosive 120 can be an ignitor 125, pyrotechnic device, explosive device, or explosive material, any of which may be currently known or developed in the future. In one or more arrangements, the ignitor 125 can be a 105 mg ignitor or a 230 mg ignitor.

Figure 4:
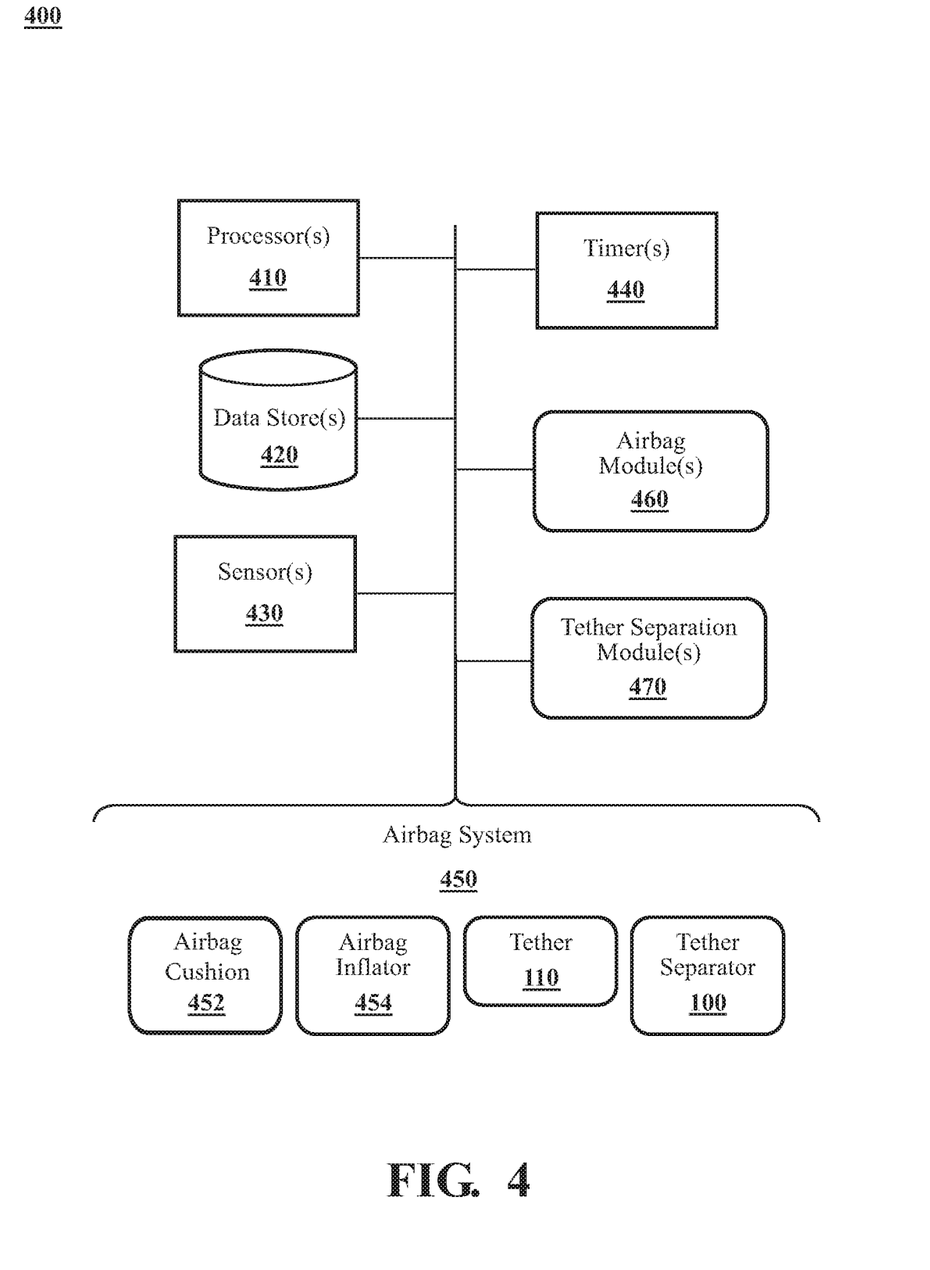
FIG. 4 is an example of an airbag and tether separation system.

The explosive 120 can be operatively connected to one or more processors 410 (FIG. 4). The term "operatively connected," as used throughout this description, can include direct or indirect connections, including connections without direct physical contact. The processor(s) 410 can be configured to activate the explosive 120. When activated, the explosive 120 can produce energy, which can be in the form of shockwaves and/or heat energy. The energy produced by the explosive 120 can be known and within a predetermined range.

In some arrangements, the tether separator 105 can include a focus sleeve 130. The focus sleeve 130 can include an exit opening 132. The focus sleeve 130 can be configured to direct the shockwaves and/or heat energy produced by the explosive 120 to the exit opening 132. In some arrangements, the focus sleeve 130 can have a region of reduced cross-sectional area 134 leading to the exit opening 132. The heat energy produced by the explosive 120 can have an associated temperature.

The focus sleeve 130 can be made of any suitable material that can withstand the energy generated by the explosive 120 when activated. The focus sleeve 130 can have any suitable size, shape, and/or configuration. The focus sleeve 130 can be made of a single piece, or it can be made of a plurality of pieces.

The explosive 120 can be at least partially located within the focus sleeve 130. In some arrangements, the focus sleeve 130 can be configured to hold the explosive 120 in place therein. For instance, the focus sleeve 130 can have an inner wall 136. The inner wall 136 can be contoured to engage the explosive 120, such as by frictional engagement. However, it will be appreciated that, alternatively or additionally, the explosive 120 can be held in the focus sleeve 130 in other ways, such as one or more fasteners, one or more adhesives, and/or one or more forms of mechanical engagement.

In some arrangements, the tether separator 105 can include a tether separator housing 140. The focus sleeve 130 and/or the explosive 120 can be at least partially enclosed within a tether separator housing 140. The tether separator housing 140 can be made of any suitable material. The focus sleeve 130 can be operatively connected to the tether separator housing 140 in any suitable manner, including, for example, one or more fasteners, one or more adhesives, and/or one or more forms of mechanical engagement, just to name a few possibilities. The tether separator housing 140 can be made of any suitable material, including, for example, plastic and/or metal.

The tether separator housing 140 can have any suitable size, shape, and/or configuration. In one or more arrangements, the tether separator housing 140 can include slots 142, 143 defined therein. The slots 142, 143 can be substantially aligned with each other. The slots 142, 143 can be sized, shaped, and/or configured to allow at least a portion of the tether 110 to be received therein.

In some arrangements, the tether separator housing 140 can be operatively connected to an airbag housing 150. The airbag housing 150 can be a driver airbag housing or a passenger airbag housing. The tether separator housing 140 can be operatively connected to the airbag housing 150 in any suitable manner, including, for example, one or more fasteners, one or more adhesives, and/or one or more forms of mechanical engagement, just to name a few possibilities.

A slot 152 can be defined in the airbag housing 150. The slot 152 can be sized, shaped, and/or configured to allow passage of at least a portion of the tether 110. The slot 152 in the airbag housing 150 can be substantially aligned with the slots 142, 143 in the tether separator housing 140.

Turning to the tether 110, a first end of the tether 110 can be anchored to any suitable structure at or near the tether separator 105, and a second end of the tether 110 can be operatively connected to a closure member, which can be used to selectively cover and uncover a vent hole in an airbag cushion. The tether 110 can have any suitable configuration, now known or later developed. In one or more arrangements, the tether 110 can be a strap-like or belt-like structure. The tether 110 can have any suitable dimensions. The tether 110 can be made of any suitable material. In one or more arrangements, the tether 110 can be made of a fabric material. As an example, the tether 110 can be made of nylon 66 (PA66) or polyethylene terephthalate (PET). The tether 110 can be made of a single layer of material, or it can be made of a plurality of layers.

The material of the tether 110 can have various associated properties. For example, the material of the tether 110 can have an associated melting point. The melting point of the material can be less than the temperature of the heat energy produced by the explosive 120. As another example, the material of the tether 110 can have an associated tensile strength. The tensile strength of the material can be sufficient to withstand the expected airbag deployment forces acting on the tether 110.

The tether 110 can include a separation region 112. The separation region 112 can be a region of the tether 110 where the tether 110 is intended to be separated during airbag deployment. It will be appreciated that the term "separated" and variants thereof includes any manner of separation of the tether 110 into two separate pieces. Non-limiting examples of separating can include disintegrating, tearing, cutting, ripping, shearing, severing, shredding, slicing, splitting, disconnecting, breaking, cleaving, burning, melting, and any combination thereof.

The separation region 112 of the tether 110 can be operatively positioned relative to the explosive 120. For instance, the separation region 112 can be positioned such that the energy produced by the explosive 120, when activated, separates the tether 110. In some arrangements, the separation region 112 can be spaced from the explosive 120 within a predetermined distance.

Alternatively or additionally, the separation region 112 of the tether 110 can be operatively positioned relative to the exit opening 132 of the focus sleeve 130. For instance, the separation region 112 can be spaced from the exit opening 132 such that the energy produced by the explosive 120, when passing out of the exit opening 132, separates the tether 110. In some arrangements, the separation region 112 can be spaced from the exit opening 132 within a predetermined distance.

In one or more arrangements, a portion of the tether 110, including at least the separation region 112, can be located within the tether separator housing 140. To that end, a portion of the tether 110 can pass through the aligned slots 142, 143 of the tether separator housing 140 and a slot 152 in the airbag housing 150.

In some arrangements, a portion of the tether 110, including at least the separation region 112, can be held in tension. In some arrangements, the separation region 112 can be defined by the portion of the tether 110 that is held in tension or a portion thereof. The tensioning of the tether 110 can be achieved in various ways. For instance, the tether 110 can be held in tension between a first anchor area 114 and a second anchor area 116. Any suitable degree of tension can be provided. It will be appreciated that, by providing the portion of the tether 110 in tension, the separation region 112 of the tether 110 can be maintained within a distance from the exit opening 132 of the focus sleeve 130 or otherwise maintained at a distance from the explosive 120. If the portion of the tether 110 was slack or otherwise not in tension, then the tether 110 could potentially bow or otherwise move in a direction away from the explosive 120 or the exit opening 132. Consequently, the shockwaves and/or heat energy produced by the explosive 120 may have a reduced effect on the tether 110, possibly being insufficient to separate the tether 110.

Tensioning the portion of the tether 110 can be achieved in any suitable manner. For instance, the tether 110 can be anchored at the first anchor area 114 and the second anchor area 116. In one or more arrangements, the first anchor area 114 can be generally located on one side of the tether separator housing 140. In one or more arrangements, at the first anchor area 114, the tether 110 can be fixed to the tether separator housing 140 or some other structure, such as by one or more fasteners, one or more adhesives, and/or one or more forms of mechanical engagement. Alternatively or additionally, the tether 110 can be knotted or sewn upon itself and/or to some other structure at the first anchor area 114.

In one or more arrangements, the second anchor area 116 can be generally located on an opposite side of the tether separator housing 140 from the first anchor area 114. In the second anchor area 116, the tether 110 can be fixed to the airbag housing 150 or some other structure, such as by one or more fasteners, one or more adhesives, and/or one or more forms of mechanical engagement. Alternatively or additionally, the tether 110 can be knotted or sewn upon itself and/or to some other structure at the second anchor area 116. In some arrangements, a connector 118 can be used to fix the tether 110 at the second anchor area 116. In some arrangements, the connector 118 can close and/or substantially close the slot 152 defined in the airbag housing 150.

FIG. 1 shows the tether separator 105 in a non-activated state. The portion of the tether 110 can be held in tension. FIG. 2 shows the tether separator 105 in an activated state. The explosive 120 is activated. As a result, the explosive 120 can produce energy 200, primarily in the form of shockwaves and/or heat. The focus sleeve 130 can direct the shockwaves and/or the heat energy to the separation region 112 of the tether 110, which is held in tension. The shockwaves and/or the heat energy can cause the tether 110 to be separated into two pieces (the first tether piece 110' and the second tether piece 110"). FIG. 3 shows the tether separator 105 in a post-activated state. The second tether piece 110" is released, which, in turn, can cause an active vent to open or close.

The tether separator 105 can be part of an airbag tether separator system. FIG. 4 shows an example of an airbag tether separator system 400. Some of the possible elements of the airbag tether separator system 400 are shown in FIG. 4 and will now be described. It will be understood that it is not necessary for the airbag tether separator system 400 to have all of the elements shown in FIG. 4 or described herein.

The airbag tether separator system 400 can include a one or more processors 410, one or more data stores 420, one or more sensors 430, one or more timers 440, one or more airbag systems 450, one or more airbag modules 460, and/or one or more tether separation modules 470. The various elements of the airbag tether separator system 400 can be operatively connected and/or communicatively coupled to each other in any suitable manner and in any suitable combination.

The airbag tether separator system 400 can include an airbag system 450. The airbag system 450 can include various components related to airbags. For instance, the airbag system 450 can include an airbag cushion 452, an inflator 454, the tether 110, and a tether separator 105. These can be any of these types of components, now known or later developed. The tether separator 105 and the tether 110 can be as described in connection with FIGS. 1 and 2.

The airbag tether separator system 400 can include one or more modules. The modules can be implemented as computer readable program code that, when executed by a processor, implement one or more of the various processes described herein. One or more of the modules can be a component of the processor(s) 410, or one or more of the modules can be executed on and/or distributed among other processing systems to which the processor(s) 410 is operatively connected. The modules can include instructions (e.g., program logic) executable by one or more processor(s) 410. Alternatively or in addition, one or more data stores 420 may contain such instructions. The modules described herein can include artificial or computational intelligence elements, e.g., neural network, fuzzy logic or other machine learning algorithms. Further, the modules can be distributed among a plurality of modules.

The airbag tether separator system 400 can include one or more airbag modules 460. The airbag module(s) 460 can be any module, now known or later developed, configured to control the deployment of the airbag. The airbag module(s) 460 can send control signals to cause the airbag to be inflated. The airbag module(s) 460 can analyze data from the sensor(s) 430 to determine when to activate the airbag.

The airbag tether separator system 400 can include one or more tether separation modules 470. The tether separation module(s) 470 can be configured to control the separation of the tether.

The tether separation module(s) 470 can be configured to send control signals to the tether separator 105 to cause the explosive 120 to be activated. The tether separation module(s) 470 can activate the explosive based on data from the sensor(s) 430, the timer(s) 440, and/or responsive to an input or command from any source.

Figure 5:
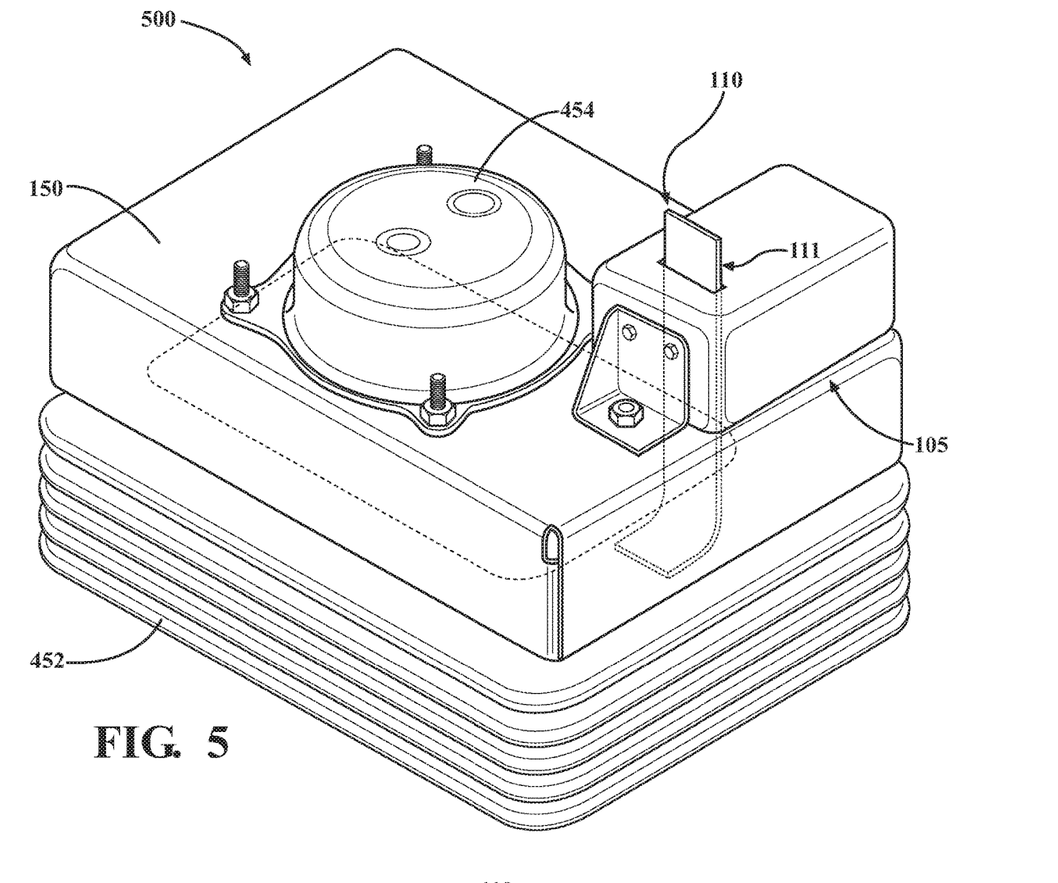
FIG. 5 is a view of a portion of an airbag system including an airbag and a tether separator, showing the airbag cushion and the tether separator in a non-activated state.

A non-limiting example of the operation of the arrangements described herein will now be presented in connection to FIGS. 5-10. FIG. 5 shows a view of a portion of an airbag system 500. The airbag system can include an airbag cushion 452, an inflator 454, a tether 110, a tether separator 105, and an airbag housing 150. Of course, it will be recognized that the airbag system 500 can include additional or alternative components to those shown. The airbag cushion 452 and the tether separator 105 are in a non-activated state. It should be noted that FIG. 5 corresponds to the condition of the tether separator 105 shown in FIG. 1.

Figure 6:
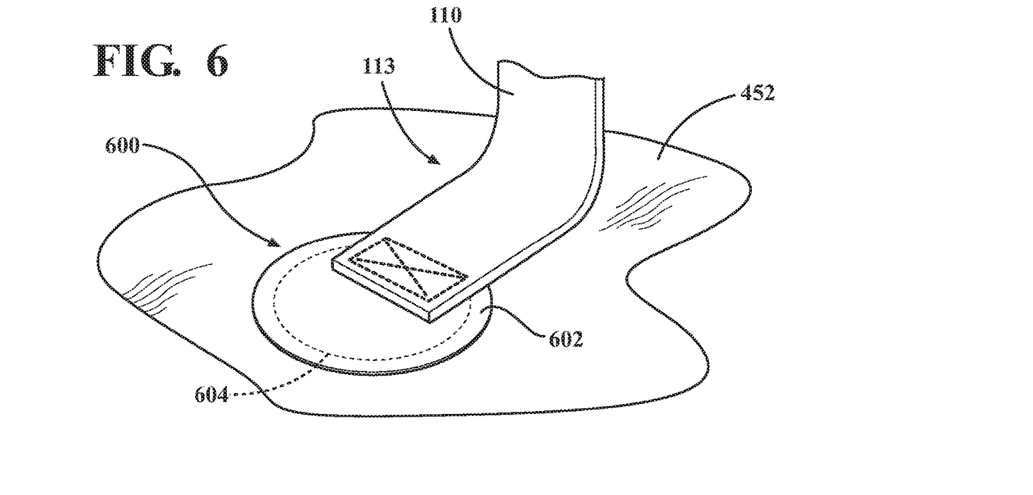
FIG. 6 is a view of a portion of the interior of the airbag, showing a tether operatively connected to an active vent.

A first end region 111 of the tether 110 can be fixed at or near the tether separator 105. The first end region 111 can include a first end of the tether 110. Referring to FIG. 6, a second end region 113 of the tether 110 can be operatively connected to an active vent 600 of the airbag cushion 452 in any suitable manner. The second end region 113 can include a second end of the tether 110. In this example, the active vent 600 includes a closure member 602 that closes a vent opening 604. In some instances, the closure member 602 can be attached to the airbag cushion 452 so as to substantially seal the vent opening 604. However, it will be appreciated that other manners of closing the vent opening 604 are possible. The closure member 602 can be a piece of fabric. In some arrangements, the closure member 602 can be the same material as the airbag cushion 452 or the tether 110.

Figure 7:
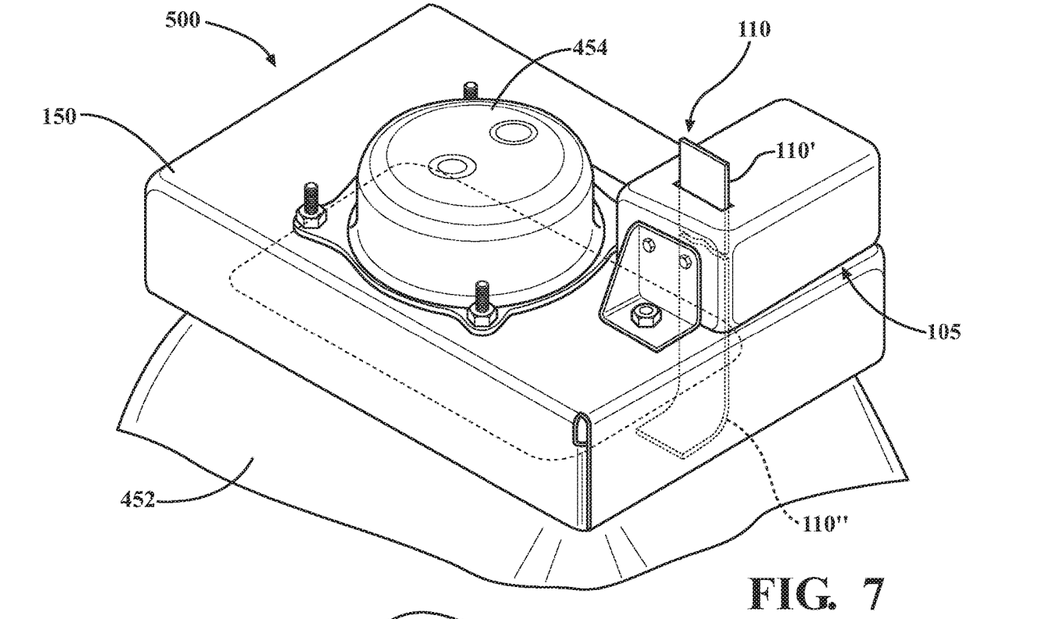
FIG. 7 is a view of the portion of the airbag system, showing the airbag cushion being deployed and the tether separator in an activated state.

When an airbag deployment condition is detected, the airbag cushion 452 can be activated. The inflator 454 can be activated to inject gas into the airbag cushion 452, causing it to rapidly expand. The inflator 454 can be any type of inflator, now known or later developed. FIG. 7 shows the airbag cushion 452 as being deployed. FIG. 7 corresponds to the condition of the tether separator 105 shown in FIG. 2. The tether separator 105 can be activated to cause the explosive 120 to be activated. The tether separator 105 can be activated at any time and/or based on any predetermined condition or criteria. For instance, the tether separator 105 can be activated at a predetermined time after the airbag cushion 452 has deployed. As another example, the tether separator 105 can be activated when an internal pressure of the airbag is reached.

Figure 8:
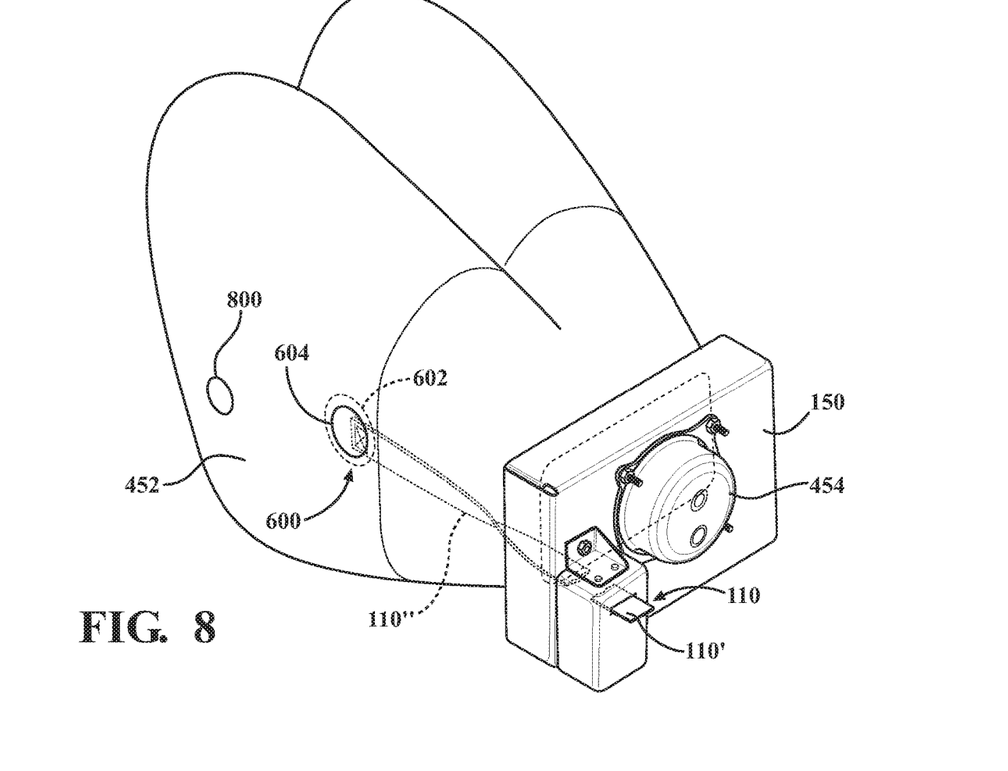
FIG. 8 is a view of the deployed airbag, showing the active vent in a closed condition.

The shockwaves and/or the heat energy produced by the explosive 120 can cause the tether 110 to be separated in the separation region 112 into two separate pieces. Thus, at this point, there is a first tether piece 110' and a second tether piece 110". The first tether piece 110' can remain fixed at the first end region 111. The second tether piece 110" can be free to move within the airbag cushion 452. At this moment, the active vent 600 is still closed, as is shown in FIG. 8. It should be noted that the airbag cushion 452 can include additional vents for relieving internal pressure of the airbag cushion 452. For instance, the airbag cushion 452 can include additional active vents. Alternatively or additionally, the airbag cushion 452 can include one or more discrete vents 800, which are vent openings in the airbag cushion 452 that in an open condition.

Figure 9:
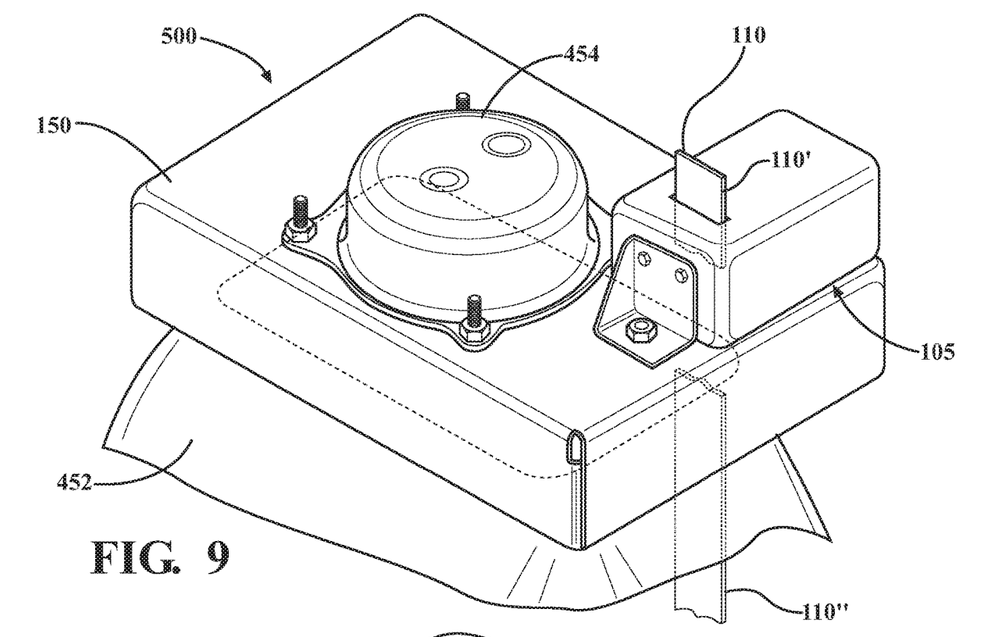
FIG. 9 is a view of the portion of the airbag system, showing the airbag cushion being deployed and the tether being separated.
Figure 10:
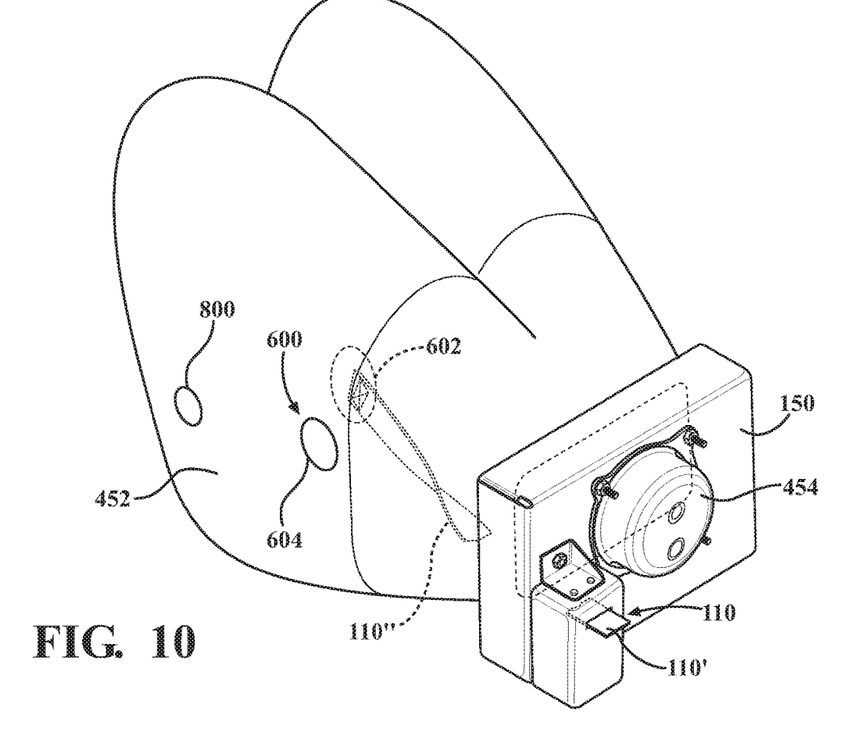
FIG. 10 is a view of the deployed airbag, showing the active vent in an open condition.

Referring to FIG. 9, shows a post-activated state of the tether separator 105. The second tether piece 110" can move within the interior of the airbag cushion 452. FIG. 9 corresponds to the condition of the tether separator 105 shown in FIG. 3. The separation of the tether 110 can cause the active vent 600 to be opened, as is shown in FIG. 10. The separation of the tether 110 can allow the closure member 602 to lift off of the vent opening 604. With the active vent 600 being open, pressure within the airbag cushion 452 can be relieved.

In the arrangements described above, the tether 110 is used in connection with one example of an active vent of the airbag cushion 452 in which the separation of the tether 110 causes the active vent to open. However, it should be noted that there are various active vent configurations. In some arrangements, the separation of the tether 110 can cause the active vent to close. It will be understood that arrangements described herein can be used in connection with any active vent system, now known or later developed, that makes use of the separation of a tether 110. Further, it will be appreciated that the tether separator arrangements described herein can be used to separate tethers that are not used in connected with an active vent.

It should be noted that, in the arrangements described in connection with FIGS. 1-3, a portion of the tether 110 can be held in tension. By tensioning a portion of the tether 110, the movement of this portion away from the explosive 120 can be minimized. However, it will be appreciated that the tether 110 can be held in place or its movement constrained in other ways. FIGS. 11-17 show examples of various arrangements to that end.

Figure 11:
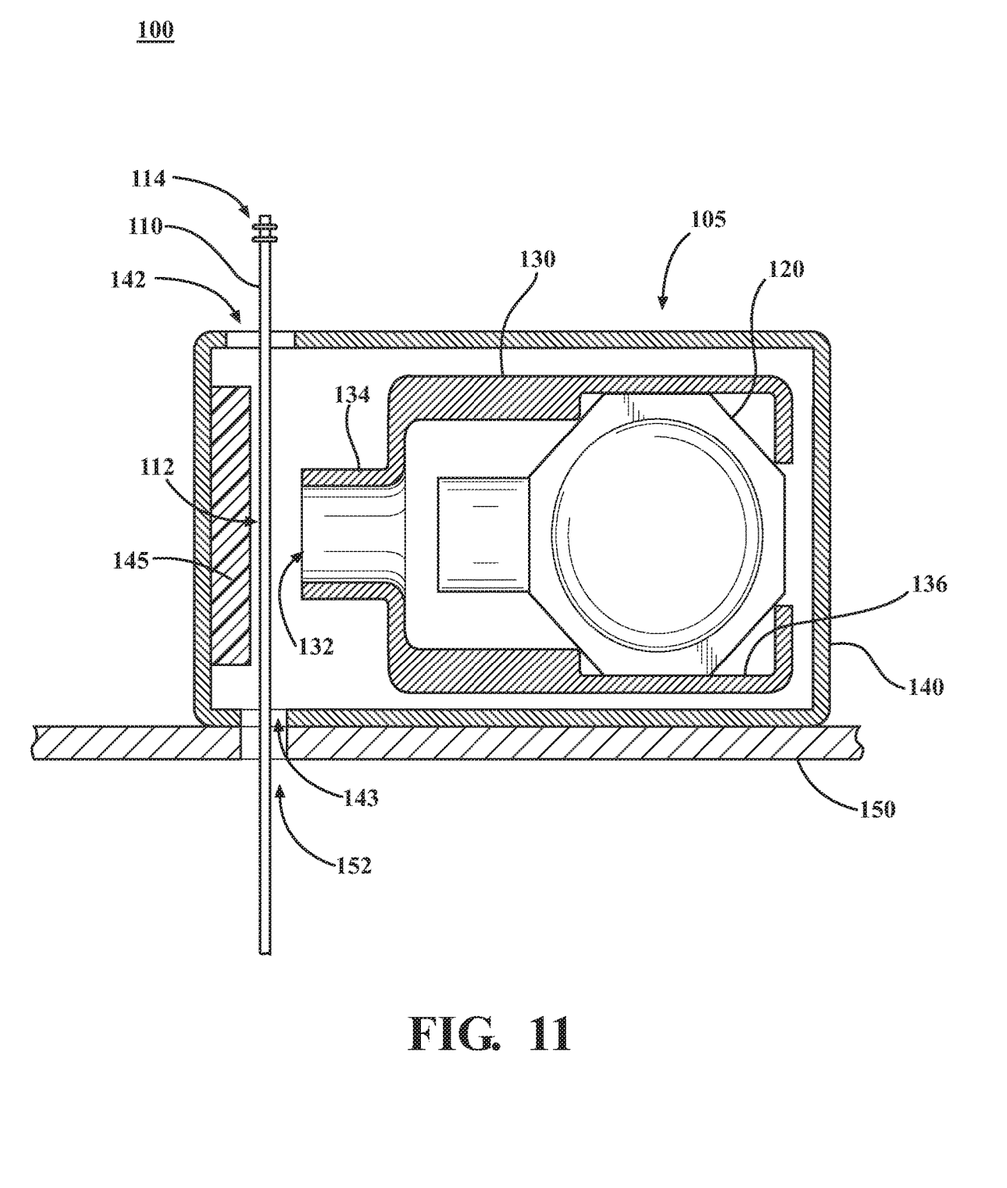
FIG. 11 is a view of the airbag tether separation system, showing an arrangement in which a backing plate constrains movement of the tether.

Referring to FIG. 11, a view of another arrangement of the airbag tether separation system 100 is shown. In this example, the airbag tether separation system 100 can include a backing plate 145. The backing plate 145 can constrain the movement of the tether 110 at least in a direction away from the explosive 120 and/or the exit opening 132 of the focus sleeve 130 (e.g., to the left in the orientation shown in FIG. 11).

The backing plate 145 can have any suitable size, shape, and/or configuration. In some arrangements, the backing plate 145 can be configured and/or positioned such that the movement of the tether 110 is restricted to being located within a sufficient distance from the exit opening 132 of the focus sleeve 130 and/or the explosive 120 such that the tether 110 will separate when the explosive 120 is activated. The sufficient distance can be based on one or more factors, including, for example, the load of the explosive 120 and/or the material of the tether 110. As a non-limiting example, when the ignitor load is about 1 gram and the tether 110 is made of PA66 or PET, the distance can be about 40 mm or less. In some arrangements, the distance can be about 35 mm or less, about 30 mm or less, about 25 mm or less, about 20 mm or less, about 15 mm or less, or about 10 mm or less, depending on the material of the tether 110 and/or the load of the explosive 120.

The backing plate 145 can be made of any suitable material. For instance, the backing plate 145 can be made of a material that can withstand the shockwaves and/or the heat energy produced by the explosive 120. The backing plate 145 can be made of a material that has a higher melting point than the material of the tether 110. In some arrangements, the backing plate 145 can be made of the same material as the tether separator housing 140.

In some arrangements, the backing plate 145 can be a separate structure from the tether separator housing 140. In such case, the backing plate 145 can be operatively connected to the tether separator housing 140 in any suitable manner, such as one or more fasteners, one or more adhesives, and/or one or more forms of mechanical engagement. In some arrangements, the backing plate 145 can be formed as a unitary structure with the tether separator housing 140.

Figure 12:
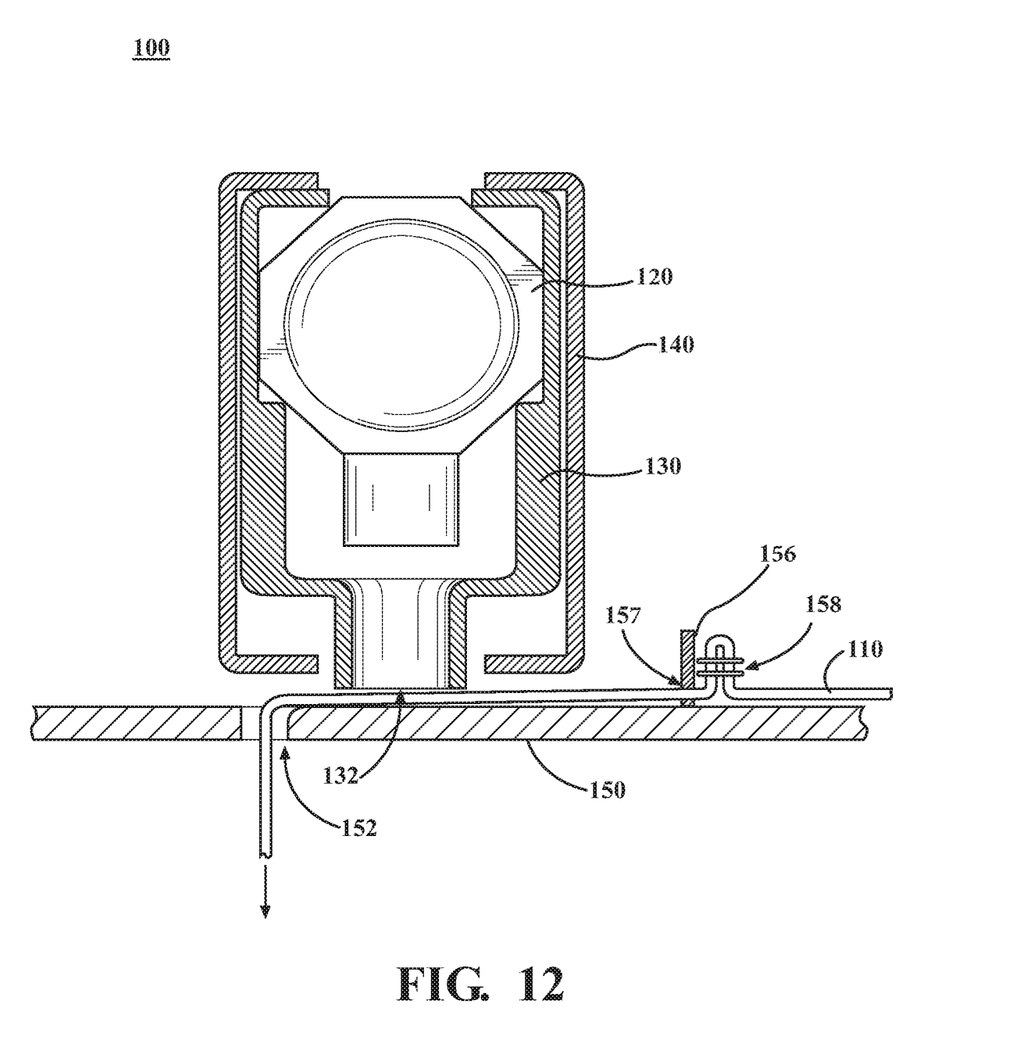
FIG. 12 is a view of the airbag tether separation system, showing an arrangement in which an airbag housing constrains movement of the tether.

Referring to FIG. 12, a view of another arrangement of the airbag tether separation system 100 is shown. In this example, the airbag tether separation system 100 can use the airbag housing 150 to constrain the movement of the tether 110 at least in a direction away from the explosive 120 and/or the exit opening 132 of the focus sleeve 130 (e.g., downwardly in the orientation shown in FIG. 11). In this arrangement, the focus sleeve 130 and the tether separator housing 140 can be arranged substantially perpendicular to the airbag housing 150. In some arrangements, a portion of the focus sleeve 130, such as the exit opening 132, can extend outside of the tether separator housing 140.

The focus sleeve 130, the explosive 120, the tether separator housing 140, and/or the airbag housing 150 can be arranged such that the movement of the tether 110 is restricted to being located within a sufficient distance from the exit opening 132 of the focus sleeve 130 and/or the explosive 120 such that the tether 110 will separate when the explosive 120 is activated.

In some arrangements, the airbag housing 150 can include a protrusion 156 that includes an aperture 157. The tether 110 can pass through the aperture 157 in the protrusion 156 as well as through the slot 152 in the airbag housing 150.

The tether 110 can be configured in region 158 to prevent the end of the tether 110 from passing through the aperture 157, thereby keeping the tether 110 in place. For instance, the tether 110 can be knotted in the region 158. As another example, the tether 110 can be folded upon itself and sewn or otherwise attached together in the region 158. Alternatively or in addition, a separate element or connected can be attached to the tether 110 in the region 158.

Figure 13:
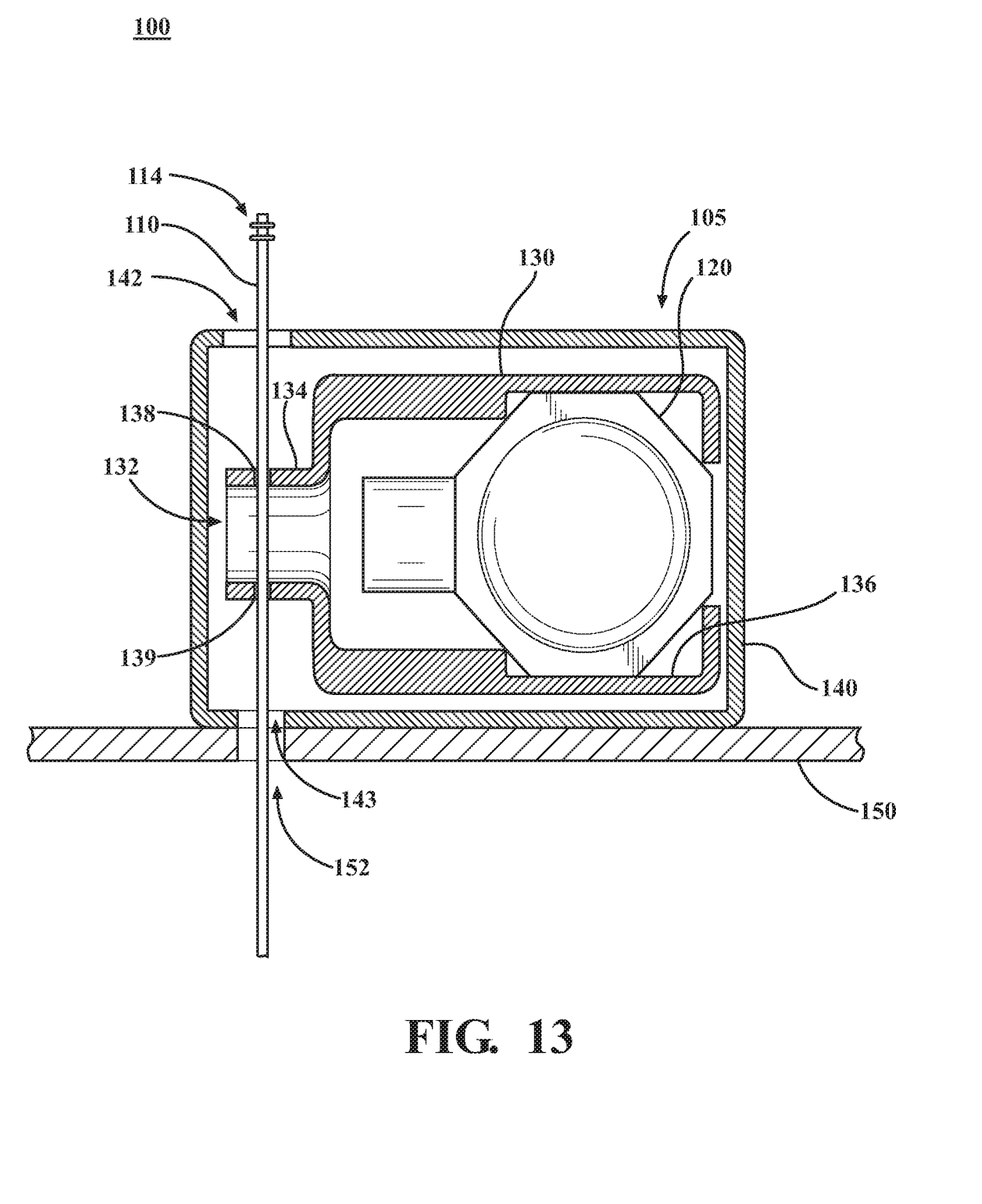
FIG. 13 is a view of the airbag tether separation system, showing an arrangement in which a focus sleeve constrains movement of the tether.

Referring to FIG. 13, a view of another arrangement of the airbag tether separation system 100 is shown. In this example, the focus sleeve 130 can be configured to constrain the movement of the tether 110 at least in a direction away from the explosive 120 (e.g., to the left in the orientation shown in FIG. 13). The focus sleeve 130 can also be configured to constrain the movement of the tether 110 in a direction toward the explosive 120 (e.g., to the right in the orientation shown in FIG. 13). In this arrangement, the tether 110 can pass through the focus sleeve 130. For instance, the focus sleeve 130 can include slots 138, 139. The slot 138 can be substantially aligned with the slot 139. The tether 110 can pass through the slots 138, 139. The slots 138, 139 can have any suitable size, shape, and/or configuration. The slots 138, 139 can be located before the exit opening 132 of the focus sleeve 130 relative to the explosive 120.

In some arrangements, the slots 138, 139 can be configured and/or positioned such that the movement of the tether 110 is restricted to being located within a sufficient distance from the explosive 120 such that the tether 110 will separate when the explosive 120 is activated.

Figure 14:
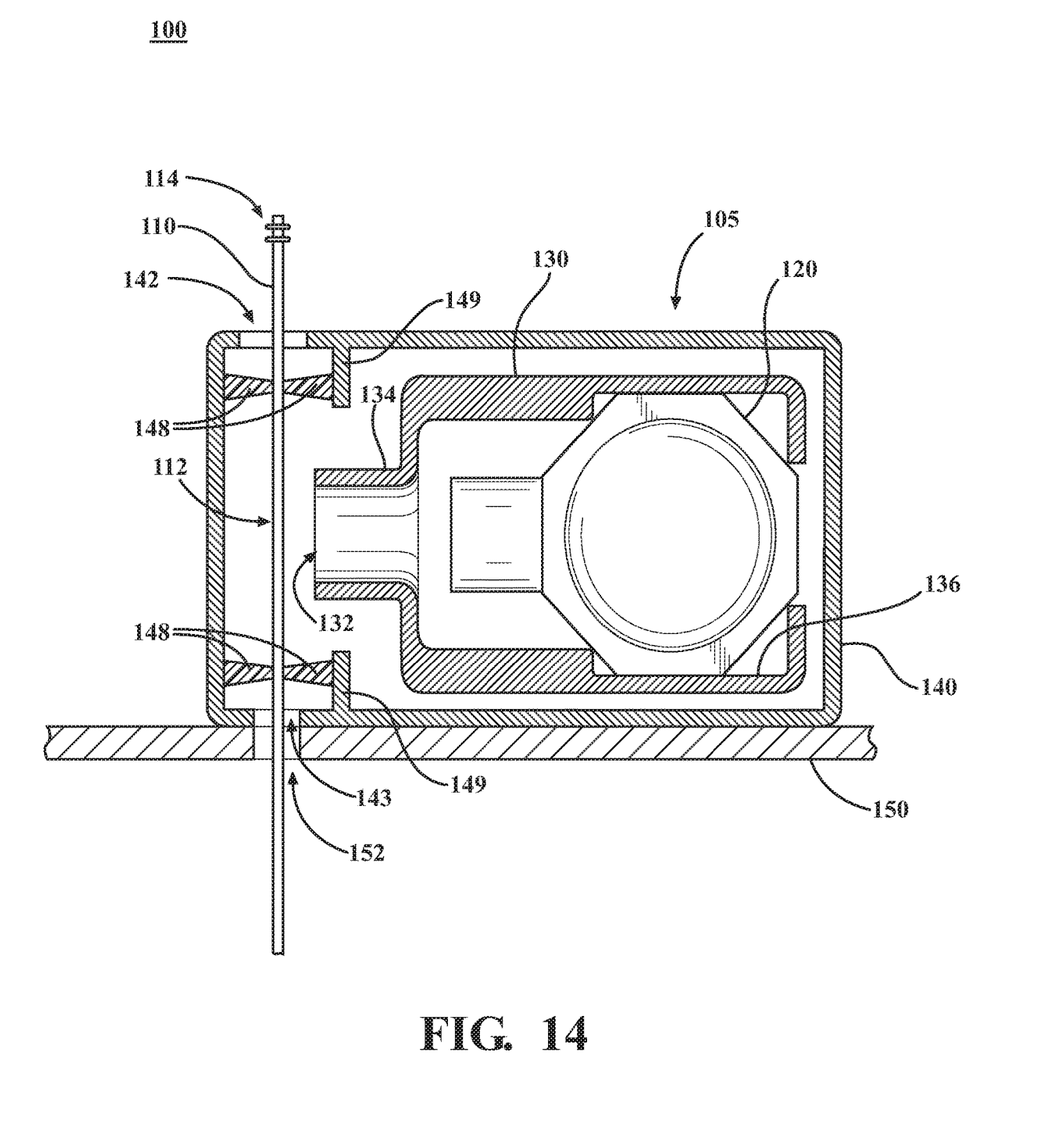
FIG. 14 is a view of the airbag tether separation system, showing an arrangement in which a plurality of gripping members constrain movement of the tether.

Referring to FIG. 14, a view of another arrangement of the airbag tether separation system 100 is shown. In this example, the airbag tether separation system 100 can use gripping members 148 to constrain the movement of the tether 110 at least in a direction away from the explosive 120 and/or the exit opening 132 of the focus sleeve 130 (e.g., to the left in the orientation shown in FIG. 14). The gripping members 148 can also constrain the movement of the tether 110 in a direction toward the explosive 120 and/or the exit opening 132 of the focus sleeve 130 (e.g., to the right in the orientation shown in FIG. 14).

The gripping members 148 can be any type of gripping structure, now known or later developed. The gripping members 148 can be made of any suitable material, such as rubber, plastic, composite, and/or metal. The gripping members 148 can have any suitable size, shape, and/or configuration. In one or more arrangements, the gripping members 148 can be provided in two sets as is shown in FIG. 14. Each set can grippingly engage opposite sides of the tether 110. The gripping members 148 can be operatively connected to the tether separator housing 140. In some arrangements, the tether separator housing may include one or more protrusions 149 to which the gripping members 148 can be operatively connected.

In some arrangements, the gripping members 148 can be configured and/or positioned such that movement of the tether 110 is restricted to being located within a sufficient distance from the exit opening 132 of the focus sleeve 130 and/or the explosive 120 such that the tether 110 will separate when the explosive 120 is activated.

Figure 15:
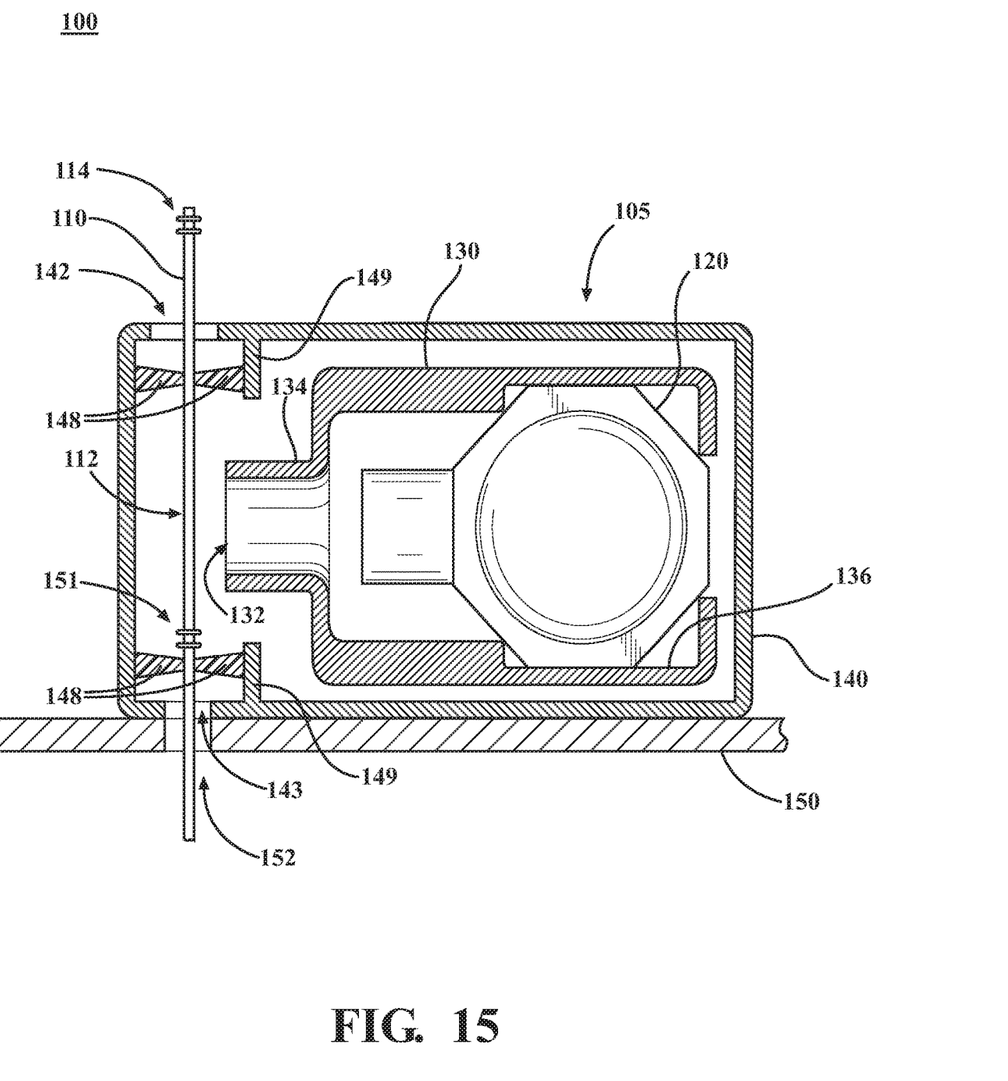
FIG. 15 is a view of the airbag tether separation system, showing an arrangement in which gripping members constrain movement of the tether and in which the tether includes an enlarged region.

Referring to FIG. 15, a view of another arrangement of the airbag tether separation system 100 is shown. The airbag tether separation system 100 can use gripping members 148 to constrain the movement of the tether 110, similar to the arrangement described above in connection with FIG. 14. Thus, the above description of FIG. 14 can apply equally to FIG. 15.

In addition, the tether 110 can include an enlarged region 151. The enlarged region 151 can be formed in any suitable manner. For instance, the tether 110 can be knotted in the enlarged region 151. As another example, the tether 110 can be folded over upon itself and sewn or otherwise attached together. Alternatively or in addition to these examples, a connector or other member can be attached to the tether 110 to form the enlarged region 151. The enlarged region 151 is wider than the distance between a set of the gripping members 148. In particular, in the arrangement shown in FIG. 15, the enlarged region 151 is wider than the distance between the lower set of the gripping members 148. The enlarged region 151 is located along the tether 110 in the region between the two sets of the gripping members 148. More particularly, the enlarged region 151 is located along the tether 110 between the exit opening 132 of the focus sleeve 130 and the lower set of the gripping members 148.

When the explosive 120 is activated and the tether 110 separates, the portion of the tether 110 below the focus sleeve 130 moves downwardly (in the orientation shown in FIG. 15). This movement of the tether 110 can cause the enlarged region 151 to impinge upon the lower set of the gripping members 148, which are configured to allow passage of the separated tether portion, thereby releasing the portion of the tether 110.

Figure 16:
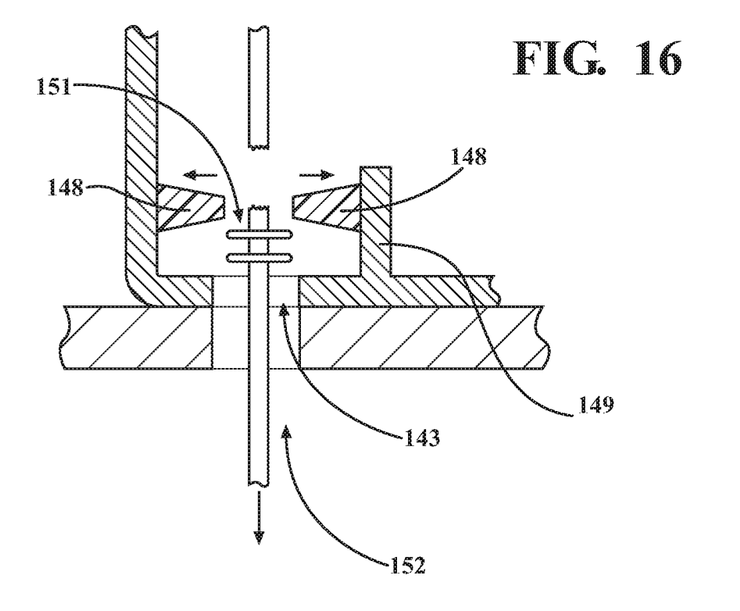
FIG. 16 is a close up view of the airbag tether separation system of FIG. 15, showing an arrangement in which the gripping members are configured to be movable to allow passage of the severed tether.

There are various ways in which the lower set of the gripping members 148 can be configured to move out of the way of the enlarged region 151. For instance, in FIG. 16, the gripping members 148 can be configured to move out of the way of the enlarged region 151. In this example, at least one of the gripping members 148 can be configured to retract laterally to increase the distance between the gripping members 148. Such retraction can be achieved and/or facilitated by rollers, sliders, hinges, and/or telescopic arrangements, just to name a few possibilities. As a result, the separated portion of the tether, including the enlarged region 151, can pass. While FIG. 16 shows the gripping members being configured to retract laterally, it will be appreciated that the gripping members 148 can move in additional and/or alternative ways. For instance, the gripping members 148 can be configured to pivot downwardly in the orientation shown in FIG. 16. The movement of the gripping members 148 can be caused by the contact with the tether 110 and/or the enlarged region 151.

Figure 17:
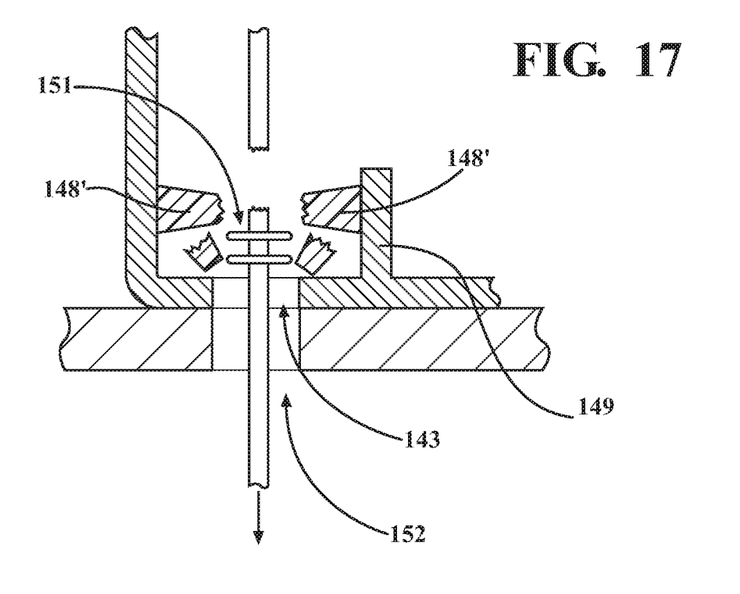
FIG. 17 is a close up view of the airbag tether separation system of FIG. 15, showing an arrangement in which the gripping members are configured to break to allow passage of the severed tether.

FIG. 17 shows another example of a way in which the gripping members 148 can be configured to allow passage of the separated tether portion. In this example, the gripping members 148 can be configured to break. Thus, when impinged upon by the enlarged region 151, the gripping members 148 can break so as to increase the distance between the gripping members 148.

It will be appreciated that arrangements described herein can provide numerous benefits, including one or more of the benefits mentioned herein. For example, arrangements described herein can effectively and reliably release a tether. Arrangements described herein can release a tether with no moving parts. Arrangements described herein can release a tether while keeping the number of parts to do so to a minimum. Arrangements described herein can release a tether without any breakaway pieces. Arrangements described herein can use commonly available ignitors. Arrangements described herein can facilitate a smaller packaging design for the tether release. Arrangements described herein can enable the ignitor to be activated at any time, regardless of cushion internal pressure. Arrangements described herein can be used in connection with various airbags, including driver and passenger airbags. Arrangements described herein may allow for potentially less expensive tether separator designs to be realized.

The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An airbag tether separation system, comprising:
   a tether; and
   a tether separator including an explosive, the tether separator being operatively positioned relative to the tether such that, when the explosive is activated, the explosive produces shockwaves, the shockwaves causing the tether to be separated into two pieces.

2. The airbag tether separation system of claim 1, wherein the tether separator includes a focus sleeve, the focus sleeve being configured to direct the shockwaves produced by the explosive toward the tether.

3. The airbag tether separation system of claim 2, further including a plurality of gripping members, wherein the gripping members are configured to grippingly engage the tether, whereby the gripping members constrain movement of the tether in a direction away from the focus sleeve.

4. The airbag tether separation system of claim 3, wherein at least one of the gripping members is movable when impinged upon by an enlarged region of the tether, whereby, when at least one of the gripping members moves, passage of a separated portion of the tether is allowed.

5. The airbag tether separation system of claim 3, wherein at least one of the gripping members is configured to break when impinged upon by an enlarged region of the tether, whereby, when at least one of the gripping members breaks, passage of a separated portion of the tether is allowed.

6. An airbag tether separation system, comprising:
   a tether; and
   a tether separator including an explosive, the tether separator being operatively positioned relative to the tether such that, when the explosive is activated, the explosive produces shockwaves and heat energy, at least one of the shockwaves and the heat energy causing the tether to be separated into two pieces,
   a portion of the tether being held in tension between two or more anchor areas at least prior to airbag deployment.

7. The airbag tether separation system of claim 6, wherein the tether is made of a material that has a melting point, wherein the heat energy produced by the explosive has a temperature, and wherein the melting point of the material is less than the temperature of the heat energy.

8. The airbag tether separation system of claim 7, wherein the tether is made of a fabric material.

9. The airbag tether separation system of claim 8, wherein the fabric material is one of nylon 66 (PA66) or polyethylene terephthalate (PET).

10. The airbag tether separation system of claim 6, wherein the tether separator includes a focus sleeve, the focus sleeve being configured to direct the shockwaves and the heat energy produced by the explosive toward the tether.

11. The airbag tether separation system of claim 10, wherein the focus sleeve is configured to hold the explosive in place.

12. The airbag tether separation system of claim 10, wherein the focus sleeve includes an exit opening, wherein the focus sleeve being configured to direct the shockwaves and heat energy produced by the explosive to the exit opening, and wherein the tether is operatively positioned relative to the exit opening.

13. The airbag tether separation system of claim 10, wherein the tether separator further includes a tether separator housing, wherein the explosive and the focus sleeve are at least partially located within the tether separation housing.

14. The airbag tether separation system of claim 13, wherein the tether separator housing includes a slot, and wherein the tether passes through the slot such that a portion of the tether is located within the tether separator housing.

15. The airbag tether separation system of claim 10, further including a backing plate, whereby the backing plate constrains movement of the tether in a direction away from the focus sleeve.

16. The airbag tether separation system of claim 10, wherein the focus sleeve includes slots configured to receive the tether, whereby the slots constrain movement of the tether in a direction away from the explosive.

17. The airbag tether separation system of claim 10, further including a plurality of gripping members, wherein the gripping members are configured to grippingly engage the tether, whereby the gripping members constrain movement of the tether in a direction away from the focus sleeve.

18. The airbag tether separation system of claim 17, wherein at least one of the gripping members is movable when impinged upon by an enlarged region of the tether, whereby, when at least one of the gripping members moves, passage of a separated portion of the tether is allowed.

19. The airbag tether separation system of claim 17, wherein at least one of the gripping members is configured to break when impinged upon by an enlarged region of the tether, whereby, when at least one of the gripping members breaks, passage of a separated portion of the tether is allowed.

20. An airbag tether separation system, comprising:
   a tether;
   a tether separator including an explosive, the tether separator being operatively positioned relative to the tether such that, when the explosive is activated, the explosive produces shockwaves and heat energy, at least one of the shockwaves and the heat energy causing the tether to be separated into two pieces, the tether separator including a focus sleeve, the focus sleeve being configured to direct the shockwaves and the heat energy produced by the explosive toward the tether; and
   an airbag housing, whereby the airbag housing constrains movement of the tether in a direction away from the focus sleeve.

* * * * *